United States Patent
Satoh (10) Patent No.: US 9,447,968 B2
(45) Date of Patent: Sep. 20, 2016

(54) COMBUSTION-HEATING SYSTEM (75) Inventor: Kimiyoshi Satoh, Yokohama (JP)

(73) Assignee: IHI CORPORATION (JP)

( * ) Notice: Subject to any disclaimer, the term of this patent is extended or adjusted under 35 U.S.C. 154(b) by 376 days.

(21) Appl. No.: 13/882,252

(22) PCT Filed: Nov. 1, 2011

(86) PCT No.: PCT/JP2011/075184
§ 371 (c)(1),
(2), (4) Date: Apr. 29, 2013

(87) PCT Pub. No.: WO2012/060377
PCT Pub. Date: May 10, 2012

(65) Prior Publication Data
US 2013/0216965 A1 Aug. 22, 2013

(30) Foreign Application Priority Data
Nov. 4, 2010 (JP) ................. 2010-247371

(51) Int. Cl.
*F23D 14/12* (2006.01)
*F24C 3/10* (2006.01)
(Continued)

(52) U.S. Cl.
CPC ............ *F23D 14/125* (2013.01); *F23C 3/00* (2013.01); *F23D 14/02* (2013.01); *F23D 14/14* (2013.01); *F23D 14/66* (2013.01); *F23C 2900/03001* (2013.01)

(58) Field of Classification Search
CPC ............ F23D 4/02; F23D 4/66; F23D 4/125; F23D 23/00; F23D 23/001; F23C 3/00
USPC ................................. 431/328, 191
See application file for complete search history.

(56) References Cited

U.S. PATENT DOCUMENTS 1,125,726 A * 1/1915 Ruppel .................. F24C 15/12
126/214 R
1,130,747 A * 3/1915 Lozano .................. F23D 14/00
126/304 A
(Continued)

FOREIGN PATENT DOCUMENTS

CN 1206446 A 1/1999
CN 2435664 Y * 6/2001
(Continued)

OTHER PUBLICATIONS

Notice of Allowance dated Nov. 26, 2013 issued in corresponding Japanese Patent Application No. 2012-541876 with English translation.
(Continued)

*Primary Examiner* — William G Corboy
(74) *Attorney, Agent, or Firm* — Ostrolenk Faber LLP (57) ABSTRACT

A combustion-heating system includes a plurality of combustion heaters connected to each other, a combustion heater including: a heating plate; an arrangement plate; an annular outer peripheral wall; a partition plate; a combustion chamber in which fuel gas collides with a flame-holding part constituting part of the outer peripheral wall, and thereby holding flames; an inflow path through which the fuel gas flows into the combustion chamber; and an outflow path through which exhaust gas flows from the combustion chamber toward the outside thereof, the outflow path to preheat the fuel gas by heat of the exhaust gas through the partition plate. The combustion-heating system includes a communication path communicating combustion chambers thereof with each other. The flame-holding part and the communication path are provided in series in a direction in which the heating plate and the arrangement plate face to each other.

7 Claims, 8 Drawing Sheets (51) Int. Cl.
*F23D 14/02* (2006.01)
*F23D 14/66* (2006.01)
*F23C 3/00* (2006.01)
*F23D 14/14* (2006.01)

(56) References Cited

U.S. PATENT DOCUMENTS

| | | | | |
|---|---|---|---|---|
| 4,919,110 | A | 4/1990 | Yokoyama | 126/394 |
| 6,494,712 | B1 | 12/2002 | Charmes | 432/175 |
| 7,527,495 | B2 | 5/2009 | Yam et al. | 431/283 |
| 2007/0209653 | A1* | 9/2007 | Beisheim | F23N 3/002 126/80 |

FOREIGN PATENT DOCUMENTS

| | | |
|---|---|---|
| CN | 201462971 U | 5/2010 |
| FR | 2791419 A1 | 9/2000 |
| JP | 01-310218 | 12/1989 |
| JP | 2003-533956 | 11/2003 |
| JP | 2004-324925 | 11/2004 |
| JP | 2007-85617 | 4/2007 |
| JP | 2007-093180 | 4/2007 |
| JP | 2007-212082 | 8/2007 |
| JP | 2007212082 A * | 8/2007 |
| JP | 2008-224197 | 9/2008 |
| TW | 200928235 A | 7/2009 |
| WO | WO 97/24510 A1 | 7/1997 |
| WO | WO 01/52332 | 7/2001 |

OTHER PUBLICATIONS

Taiwan Notice of Allowance dated Feb. 17, 2014 issued in corresponding Taiwan Patent Application No. 100139715 with English translation of Search Report only.

Korean Notice of Allowance dated Mar. 12, 2014 issued in corresponding Korean Patent Application No. 10-2013-7007877 with English translation.

Chinese Office Action, dated Sep. 4, 2014, issued in corresponding Chinese Patent Application No. 201180051914.5. English Translation of Search Report. Total 7 pages.

International Search Report and Written Opinion mailed Nov. 29, 2011 in corresponding PCT International Application No. PCT/JP2011/075184.

* cited by examiner

COMBUSTION-HEATING SYSTEM

CROSS-REFERENCE TO RELATED APPLICATIONS

The present application is a 35 U.S.C. §§371 national phase conversion of PCT/JP2011/075184, filed Nov. 1, 2011, which claims priority to Japanese Patent Application No. 2010-247371, filed Nov. 4, 2010, the contents of which are incorporated herein by reference. The PCT International Application was published in the Japanese language.

TECHNICAL FIELD

The present invention relates to a combustion-heating system in which a plurality of combustion heaters to heat an object to be heated by combusting fuel are connected to each other.

BACKGROUND ART

Conventionally, a combustion heater is used widely, in which a radiation member is heated by the combustion heat generated from the combustion of fuel gas, and industrial materials, food products or the like are heated by the radiation heat from a radiation surface of the radiation member. Regarding the combustion heater like this, for example, a technology is proposed in which materials or shapes having a high radiation factor are applied to the radiation surface in order to increase the radiation intensity (see Patent Document 1).

In the above combustion heater in the related art, fuel gas is combusted at a fuel gas outlet provided on the radiation surface, and exhaust gas is released into the surrounding environment without being gathered. Accordingly, since exhaust heat cannot be gathered, the thermal efficiency thereof may become low. In addition, since the area of the radiation surface becomes small due to the formation of the fuel gas outlet, it is difficult to increase the radiation intensity. Furthermore, there is a possibility that the temperature around the heater rises due to the heat of exhaust gas, or the surroundings are filled with exhaust gas, whereby the surrounding environment may not be improved.

Therefore, a combustion heater called a micro-combustor having improved thermal efficiency is proposed. In this combustion heater, the range over an inflow path for fuel gas, a combustion chamber, and an outflow path for the exhaust gas after combustion is formed into a sealed structure, the inflow path and the outflow path are disposed adjacent to each other, and the fuel gas before combustion is preheated by the heat of the exhaust gas, thereby improving the thermal efficiency (see Patent Document 2).

DOCUMENT OF RELATED ART

Patent Document

[Patent Document 1] Japanese Unexamined Patent Application, First Publication No. 2004-324925
[Patent Document 2] Japanese Unexamined Patent Application, First Publication No. 2007-212082

SUMMARY OF INVENTION

Technical Problem
The above combustion heater in Patent Document 2 uses the heat of exhaust gas efficiently, and has the sealed structure to gather exhaust gas. In this case, when the combustion heater is merely expanded in a two-dimensional direction (direction parallel to a heating surface) in order to increase the amount of heat or the area of the heating surface of the combustion heater, the manufacturing cost thereof may be enlarged in order to stably maintain the sealing function thereof. In addition, there is a possibility that since the heat deformation of a partition plate separating the inflow path and the outflow path from each other inside the combustion heater increases, the temperature distribution becomes non-uniform, or the emission concentration of CO (carbon monoxide) is increased by imperfect combustion, whereby the performance of the combustion heater is not exerted fully. Therefore, the inventor of the present invention tried to connect a plurality of combustion heaters to each other, thereby increasing the amount of heat or the area of the heating surface thereof.

In a combustion-heating system in which a plurality of combustion heaters are connected to each other, a function of igniting all the connected combustion heaters by one ignition is required. However, in the combustion heater in Patent Document 2, since the sealing function has to be maintained, a flame-transferring structure (structure to transfer combustion between the combustion heaters) may not be formed easily. In addition, since an outer peripheral wall of the combustion heater has a flame-holding function, if part of the outer peripheral wall is removed in order to provide the flame-transferring structure, the flame-holding performance thereof may be degraded. Thereby, there is a possibility that the CO emission concentration is increased or the proper thermal efficiency is not obtained.

The present invention has been made in view of the above circumstances, and aims to provide a combustion-heating system capable of satisfying both of the flame-transferring performance and the flame-holding performance even in a case where a plurality of combustion heaters are connected to each other.

Solution to Problem
A combustion-heating system in the present invention includes a plurality of combustion heaters connected to each other, a combustion heater including: a heating plate; an arrangement plate disposed facing to the heating plate; an annular outer peripheral wall disposed between the heating plate and the arrangement plate; a partition plate disposed between the heating plate and the arrangement plate; a combustion chamber positioned along the outer peripheral wall, the combustion chamber in which fuel gas collides with a flame-holding part constituting part of the outer peripheral wall, thereby holding flames; an inflow path in which sidewalls thereof are constituted by the arrangement plate and the partition plate, the inflow path through which the fuel gas flows into the combustion chamber; and an outflow path in which sidewalls thereof are constituted by the heating plate and the partition plate, the outflow path through which exhaust gas flows from the combustion chamber toward the outside thereof, the outflow path to preheat the fuel gas by heat of the exhaust gas through the partition plate. The combustion-heating system includes a communication path disposed at a connection part between the plurality of combustion heaters, the communication path connecting combustion chambers thereof with each other. In addition, the flame-holding part and the communication path are provided in series in a direction in which the heating plate and the arrangement plate face each other.

In this case, a height of the outer peripheral wall may be the sum of a height of the flame-holding part required to hold flames and a height of the communication path determined based on a flame-quenching distance of the communication path.

In addition, the communication path may be disposed at a position at which a distance between the combustion chambers in the plurality of combustion heaters connected to each other is the shortest.

In addition, the combustion-heating system in the present invention further includes: a first pipe connected to the inflow path, the first pipe through which the fuel gas flows into the combustion heater; a second pipe connected to the outflow path, the second pipe through which the exhaust gas flows toward the outside of the combustion heater; and a communication pipe connecting second pipes in the plurality of combustion heaters, with each other. The communication pipe may include an enlarged part in which a flow path area thereof is greater than that of the second pipes.

In addition, one of the first pipe and the second pipe is disposed inside the other of the first pipe and the second pipe, and the first pipe and the second pipe constitute a duplex pipe.

Effects of Invention

According to the present invention, both of the flame-transferring performance and the flame-holding performance can be satisfied, even in a case where a plurality of combustion heaters are connected to each other.

DESCRIPTION OF EMBODIMENTS

A preferable embodiment of the present invention is described below in detail with reference to the drawings. Dimensions, materials, other specific values or the like shown in the following embodiment are examples for easily understanding the present invention, and the present invention is not limited by these examples except a case of indicating special notes. In the description or the drawings, elements having the substantially same function or structure are denoted by the same reference sign, and a duplicate description is omitted. In the drawings, elements not directly relating to the present invention are omitted.

A combustion heater includes a main container in which a combustion chamber, an inflow path for fuel gas (uncombusted gas: gas before combustion), and an outflow path for exhaust gas (combusted gas: gas after combustion) are formed into a sealed structure. In this combustion heater, the fuel gas flowing through the inflow path is preheated by the heat of the exhaust gas flowing through the outflow path, thereby achieving excess enthalpy combustion in the combustion chamber. In the combustion heater like this, since the heat of exhaust gas is gathered, the thermal efficiency is high, and since exhaust gas is also gathered, the surrounding environment is not damaged. In addition, since a fuel gas outlet does not have to be formed on a radiation surface, the area of the radiation surface is not reduced and the radiation intensity is high.

In the combustion heater like this, particularly, in a disc-shaped combustion heater, a partition plate to transfer heat is formed of a smaller flat plate than a pair of flat plates (a heating plate and an arrangement plate) composing the main container. In addition, in the disc-shaped combustion heater, by using a simple structure in which the pair of flat plates are arranged with a gap therebetween, the heat exchange between the inflow and outflow paths is performed. Furthermore, in the disc-shaped combustion heater, a flat plate including the radiation surface has much adaptability in shape.

Since both of the high thermal efficiency and the function of gathering exhaust gas can be obtained and the usability is high, in the future, it is expected that many combustion heaters in the related art which are configured to discharge exhaust gas after combustion into the surrounding environment without treatment are replaced with disc-shaped combustion heaters like in this embodiment. However, many combustion heaters in the related art are relatively large in size, but many existing disk-shaped combustion heaters are relatively small in size. Thus, it is difficult to promptly replace large-size combustion heaters in the related art with relatively small disc-shaped combustion heaters.

When a disc-shaped combustion heater is merely expanded in the two-dimensional direction (direction parallel to a heating surface) in order to increase the amount of heat or the area of the heating surface of this combustion heater, the manufacturing cost thereof may be enlarged in order to stably maintain the sealing function thereof. In addition, there is a possibility that since the heat deformation of the partition plate separating the inflow path and the outflow path from each other inside the combustion heater increases, the temperature distribution becomes non-uniform, or the CO emission concentration is increased by imperfect combustion, whereby the performance of the combustion heater is not exerted fully. Therefore, the inventor of the present invention focused in a combustion-heating system in which a plurality of combustion heaters are connected to each other. In addition, by "connected", it is meant that combustion heaters are provided in series, and also that a plurality of combustion heaters are formed integrally. However, in the combustion heater, since the sealing function has to be maintained, a flame-transferring structure (structure to transfer combustion between the combustion heaters) may not be formed easily. In addition, since an outer peripheral wall of the combustion heater has a flame-holding function, if part of the outer peripheral wall is thoughtlessly removed in order to provide the flame-transferring structure, the flame-holding performance thereof may be degraded. Thereby, there is a possibility that the CO emission concentration is increased or proper thermal efficiency is not obtained.

The combustion-heating system in this embodiment in which the plurality of combustion heaters is connected to each other aims to satisfy both of the flame-transferring performance and the flame-holding performance. For easy understanding, first, one of combustion heaters 110 composing a combustion-heating system 100 is described below, and thereafter the combustion-heating system 100, particularly a flame-transferring function, is described in detail.
(Combustion heater 110)

Figure 1:
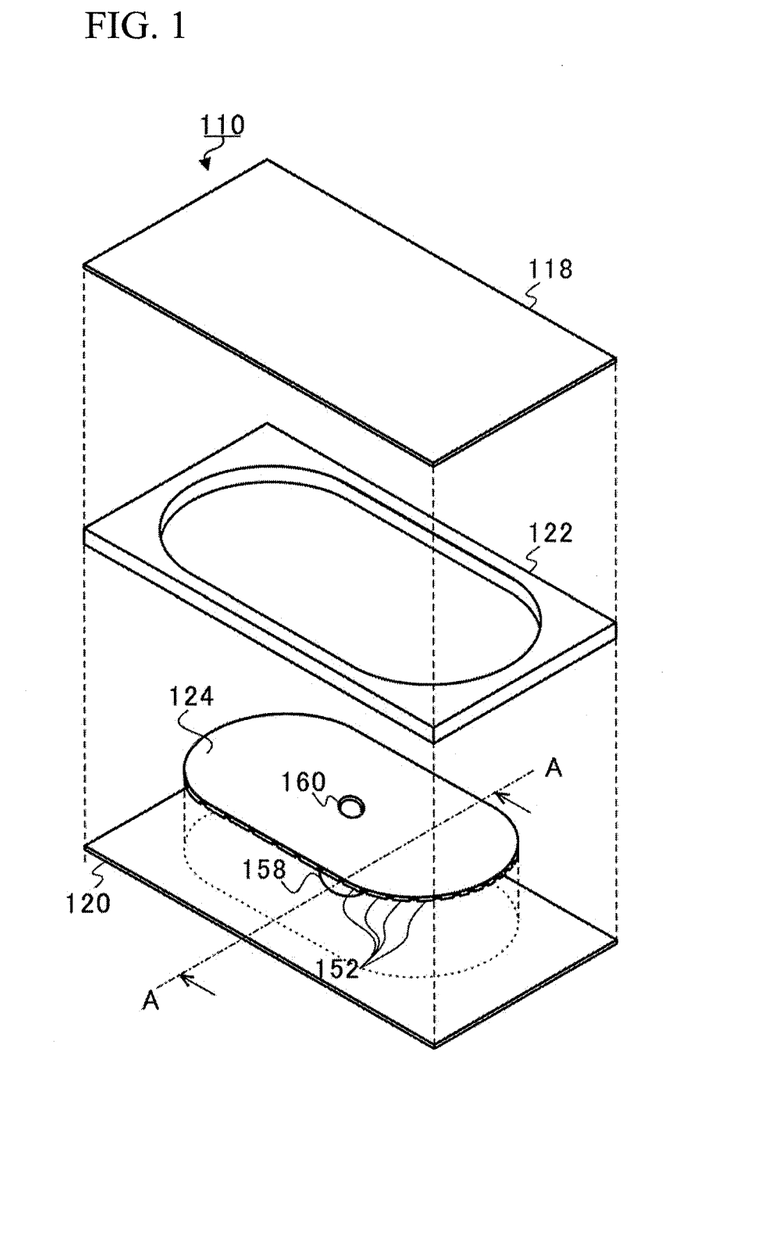
FIG. 1 is an assembly diagram to illustrate the structure of a combustion heater.
Figure 2A:
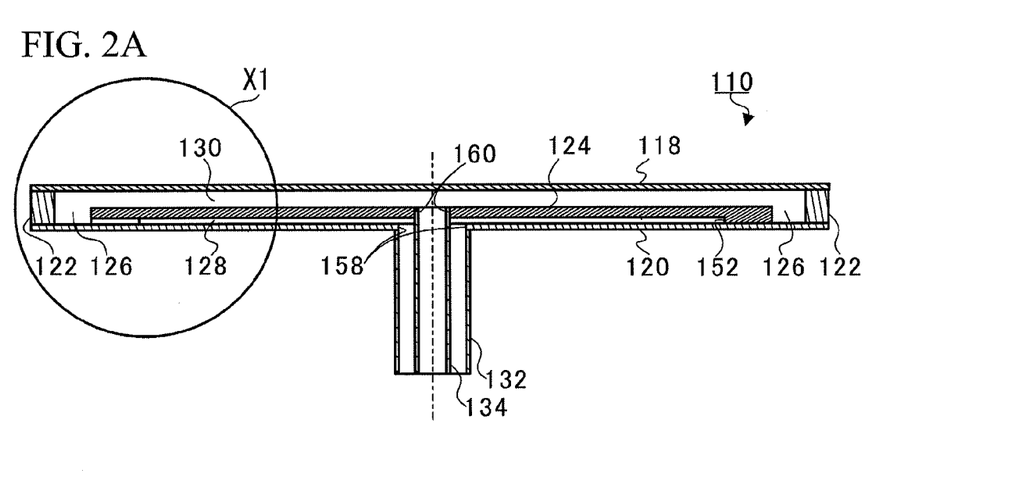
FIG. 2A is a cross-sectional view along line A-A in FIG. 1.
Figure 2B:
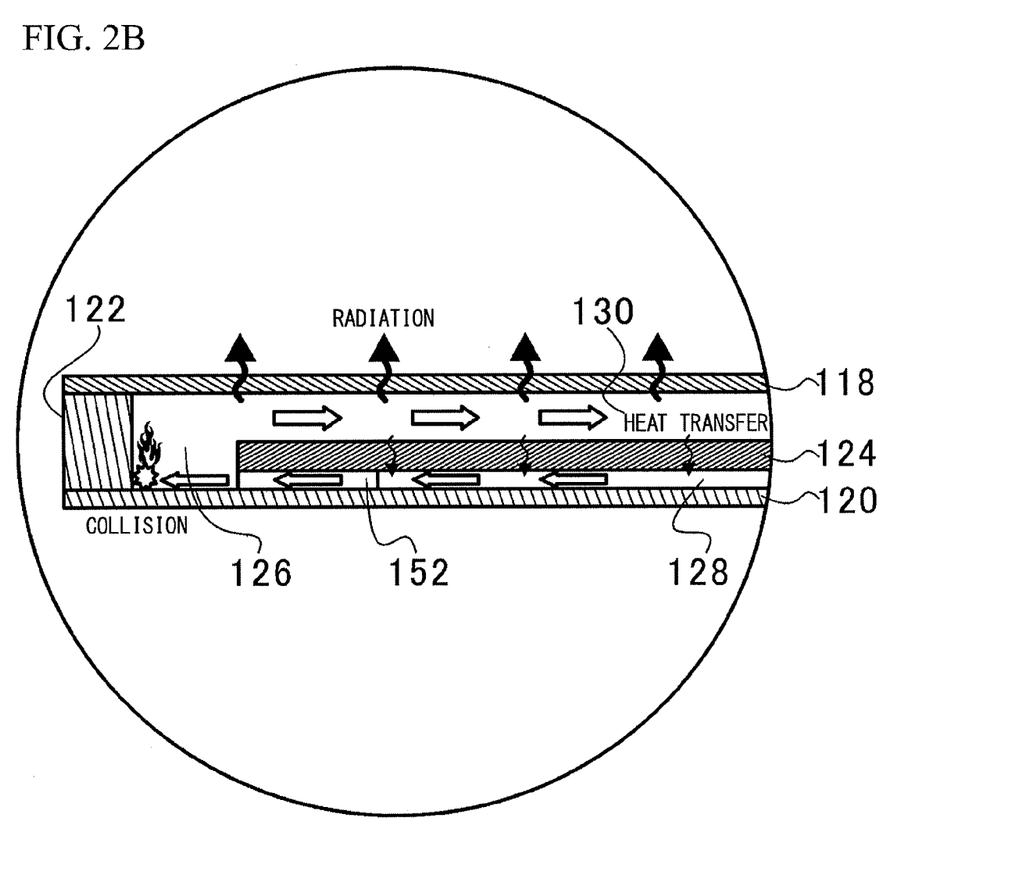
FIG. 2B is an expanded view of area X1 in FIG. 2A.

FIG. 1 is an assembly diagram to illustrate the structure of a combustion heater 110. FIG. 2A is a cross-sectional view along line A-A in FIG. 1. FIG. 2B is an expanded view of area X1 in FIG. 2A. In addition, an up and down direction in FIG. 2A represents the vertical direction in the combustion heater 110. As shown in FIG. 2A, the combustion heater 110 includes a heating plate 118, an arrangement plate 120, an outer peripheral wall 122, a partition plate 124, a combustion chamber 126, an inflow path 128, an outflow path 130, a first pipe 132, and a second pipe 134. In addition, the combustion heater 110 which is described in this embodiment has, for example, an external shape being about 220 mm×140 mm in the two-dimensional direction (as described below, 440 mm×140 mm when two heaters are connected to each other in the longitudinal direction). However, the external shape of the combustion heater 110 is not limited to the above dimensions, and can be set to suitable dimensions.

The combustion heater 110 in this embodiment is a premixing type in which the fuel gas (premixed gas) produced by premixing city gas or the like and air as oxidizing gas for combustion is supplied to a main container. In addition, the combustion heater 110 is not limited to this case, and may be a diffusing type in which both gases are mixed at the combustion chamber 126, or at the inflow path 128 just before the combustion chamber 126, thereby performing diffusing combustion.

The heating plate 118 and the arrangement plate 120 are formed of materials having high heat resistance and high oxidation resistance such as stainless steel (SUS: Stainless Used Steel), or of materials having high heat conductivity such as brass. The heating plate 118 and the arrangement plate 120 are disposed facing to each other, and are disposed approximately parallel to each other (substantially parallel to perform the excess enthalpy combustion in this embodiment). The heating plate 118 and the arrangement plate 120 have a function as a radiation member to be heated by the combustion heat generated in the combustion chamber 126. However, the arrangement plate 120 is not limited to a structure functioning as the radiation member, and for example, may have a heat-insulated structure.

In plan view, the outer peripheral wall 122 is formed so that the inner circumference thereof is a flat oval shape (shape composed of two lines approximately parallel to each other and two arcs (semicircles) connecting the two lines to each other), and so that the outer circumference thereof is a rectangular shape. The outer peripheral wall 122 is disposed between the heating plate 118 and the arrangement plate 120. An outer circumferential surface of the outer peripheral wall 122 can be used as a radiation surface. The outer peripheral wall 122 is formed in an annular shape in plan view by being disposed between the heating plate 118 and the arrangement plate 120.

The main container of the combustion heater 110 includes the outer peripheral wall 122, and the heating plate 118 and the arrangement plate 120 closing the outer peripheral wall 122 from the upper and lower sides. In this main container, the area of up and down wall surfaces (plate surfaces of the heating plate 118 and the arrangement plate 120) is larger than the area of the outer circumferential surface (outer circumferential surface of the outer peripheral wall 122). That is, the up and down wall surfaces occupy most of the outer surface of the main container. In the up and down wall surfaces, for example, the upper side surface (upper surface of the heating plate 118) constitutes the radiation surface. In addition, when fuel gas is combusted in the combustion chamber 126, first, the heating plate 118 is heated by this combustion, and thereafter heat is transferred from the radiation surface by radiation or convection of air, thereby heating an object to be heated which is positioned at the outside of the combustion heater 110. In a case where a plurality of combustion heaters 110 are connected to each other as the combustion-heating system 100, the approximately same radiation heat can be obtained from the radiation surface of each combustion heater 110. In this embodiment, the upper side surface (upper surface of the heating plate 118) in the up and down wall surfaces constitutes the radiation surface. However, the present invention is not limited to this case, and only the lower side surface (lower surface of the arrangement plate 120) may constitute the radiation surface, or both of the up and down wall surfaces may constitute the radiation surface.

The partition plate 124 is formed so that the external shape thereof is smaller than that of the heating plate 118 or the arrangement plate 120, and is formed in a shape along the inner circumferential surface of the outer peripheral wall 122. The partition plate 124 is disposed approximately parallel to both of the heating plate 118 and the arrangement plate 120, between the heating plate 118 and the arrangement plate 120. A gap is formed between the partition plate 124 and the heating plate 118, and a gap is formed between the partition plate 124 and the arrangement plate 120. The partition plate 124 is formed of materials having high heat resistance and high oxidation resistance such as stainless steel, or of materials having high heat conductivity such as brass. When gaps are formed both of between the partition plate 124 and the heating plate 118, and between the partition plate 124 and the arrangement plate 120, the partition plate 124 may be disposed so as to be inclined relative to them. In addition, there is no limit in the thickness of the partition plate 124, the heating plate 118, or the arrangement plate 120, and they may be formed so as to have an uneven shape.

With reference to the assembly diagram in FIG. 1, the positional relationships of the heating plate 118, the arrangement plate 120, the outer peripheral wall 122, and the partition plate 124 are described below. The partition plate 124 and the outer peripheral wall 122 are piled on the arrangement plate 120 from the upside thereof. In detail, as shown in FIG. 2A, the arrangement plate 120 is fixed to the end of the first pipe 132, and the partition plate 124 is fixed to the end of the second pipe 134 further protruding upward relative to the first pipe 132. Therefore, the arrangement plate 120 and the partition plate 124 are separated from each other at the distance between the end of the first pipe 132 and the end of the second pipe 134. In addition, the partition plate 124 is disposed inside the outer peripheral wall 122. At this time, a space as the combustion chamber 126 is formed between the outer edge of the partition plate 124 and the cylindrical inner circumferential surface of the outer peripheral wall 122. Finally, the heating plate 118 is piled on the outer peripheral wall 122.

The combustion chamber 126 is surrounded by the outer peripheral wall 122, the heating plate 118, the arrangement plate 120, and the outer edge of the partition plate 124, and is formed along the outer peripheral wall 122 and inside the outer peripheral wall 122. Since forming the combustion chamber 126 along the outer peripheral wall 122 like this, the capacity of the combustion chamber 126 can be secured sufficiently and the combustion load factor thereof can be low.

As shown in FIG. 2A, inside the main container, the inflow path 128 and the outflow path 130 are formed so as to be lapped over each other, in the thickness direction (direction perpendicular to the upper surface of the heating plate 118). The inflow path 128 is a space interposed between the arrangement plate 120 and the partition plate 124, and sidewalls of the inflow path 128 are constituted by the arrangement plate 120 and the partition plate 124. The inflow path 128 causes the fuel gas which has been supplied into the center of the main container, to radially flow toward the combustion chamber 126.

The outflow path 130 is a space interposed between the heating plate 118 and the partition plate 124, and sidewalls of the outflow path 130 are constituted by the heating plate 118 and the partition plate 124. The outflow path 130 causes exhaust gas from the combustion chamber 126 to be gathered to the center of the main container, and to flow toward the outside of the combustion heater 110. In addition, as shown in FIG. 2A, since the inflow path 128 and the outflow path 130 are formed inside the main container so as to be lapped over each other in the thickness direction, the heat of exhaust gas can be transferred through the partition plate 124 and thereby fuel gas can be preheated.

The first pipe 132 is connected to the inflow path 128, and causes fuel gas to flow into the combustion heater 110. Specifically, a hole 158 is provided at the center of the arrangement plate 120, the hole 158 has the same diameter as the inner diameter of the first pipe 132, and the first pipe 132 is connected to the hole 158.

The second pipe 134 is disposed inside the first pipe 132. That is, the first pipe 132 and the second pipe 134 constitute a duplex pipe. In addition, the second pipe 134 is connected to the outflow path 130, and causes exhaust gas to flow toward the outside of the combustion heater 110. Specifically, a hole 160 is provided at the center of the partition plate 124, the hole 160 has the same diameter as the outer diameter of the second pipe 134, and the second pipe 134 is connected to the hole 160. Furthermore, the second pipe 134 also has a function of transferring the heat of the exhaust gas flowing through the inside thereof, to the fuel gas flowing through the first pipe 132.

In this embodiment, the second pipe 134 is disposed inside the first pipe 132. However, the present invention is not limited to this case, the first pipe 132 may be disposed inside the second pipe 134, and the first pipe 132 and the second pipe 134 may be respectively connected to the inflow path 128 and the outflow path 130 from the side of the heating plate 118.

Next, the flows of fuel gas and exhaust gas are described specifically. In FIG. 2B in which the area X1 of FIG. 2A is expanded, arrows being painted light gray represent the flow of fuel gas, arrows being painted dark gray represent the flow of exhaust gas, and arrows being painted black represent the transfer of heat. When fuel gas is supplied to the first pipe 132, the fuel gas flows from the central part of the arrangement plate 120 into the inflow path 128, and flows to the combustion chamber 126 so as to expand radially in the horizontal direction. The fuel gas collides with the outer peripheral wall 122 at the combustion chamber 126, the fuel gas is combusted, and thereafter is changed into exhaust gas having a high temperature. The exhaust gas flows from the combustion chamber 126 through the outflow path 130 into the second pipe 134.

The partition plate 124 is formed of materials which transfer heat relatively easily, and the heat of the exhaust gas passing through the outflow path 130 is transferred (heat-transferred) to the fuel gas passing through the inflow path 128, via the partition plate 124. In this embodiment, the exhaust gas flowing through the outflow path 130 and the fuel gas flowing through the inflow path 128 become countercurrents (counter flows) to each other so that the partition plate 124 is interposed therebetween, and thus fuel gas can be efficiently preheated by the heat of exhaust gas, thereby obtaining the high thermal efficiency. By means of the combustion after preheating fuel gas, the so-called excess enthalpy combustion, the combustion of fuel gas can be stabilized, and the concentration of CO generated by imperfect combustion can be reduced into to a very low concentration.

Furthermore, in order to enable the stable combustion in the combustion chamber 126, in consideration of a flame-quenching distance (including flame-quenching radius equivalent thereto) sufficiently capable of preventing flames from entering the inflow path 128 (combustion reaction is not transferred into the inflow path 128), at the connection part between the inflow path 128 and the combustion chamber 126, a characteristic dimension in a cross-sectional shape (hereinafter, referred to as the flow path cross-sectional shape) in a direction perpendicular to the flow direction of fuel gas is preferably set less than or equal to the flame-quenching distance. In addition, the characteristic dimension is determined by a cross-sectional shape of a flow path just before fuel gas flows into the combustion chamber 126. For example, in a case where the flow path cross-sectional shape is a circular shape, the characteristic dimension represents the diameter of a circular cross-section, and in a case where the flow path cross-sectional shape is other than a circular shape, the characteristic dimension represents the equivalent hydraulic diameter of a cross-section. The equivalent hydraulic diameter is calculated by 4× a flow path cross-sectional area/a perimeter. This perimeter represents the length of a wall portion (the arrangement plate 120, the partition plate 124) which fuel gas contacts, in a flow path cross-section.

For example, when the distance between the arrangement plate 120 and the partition plate 124 is set less than or equal to the flame-quenching distance, flames are prevented from entering the inflow path 128, and the combustion is stabilized. However, in order to insure that the distance between the arrangement plate 120 and the partition plate 124 is in a range less than or equal to the flame-quenching distance, since the surface accuracy or the mounting accuracy of the arrangement plate 12Q and the partition plate 124 has to be improved, the manufacturing cost may be enlarged. In this embodiment, in order to allow the distance between the arrangement plate 120 and the partition plate 124 to be set longer than the flame-quenching distance, a plurality of projections 152 contacting the arrangement plate 120 are disposed on the lower surface (the side of the arrangement plate 12Q) of the partition plate 124 in the vicinity of the combustion chamber 126, at predetermined intervals L (see FIG. 3B).

Figure 3A:
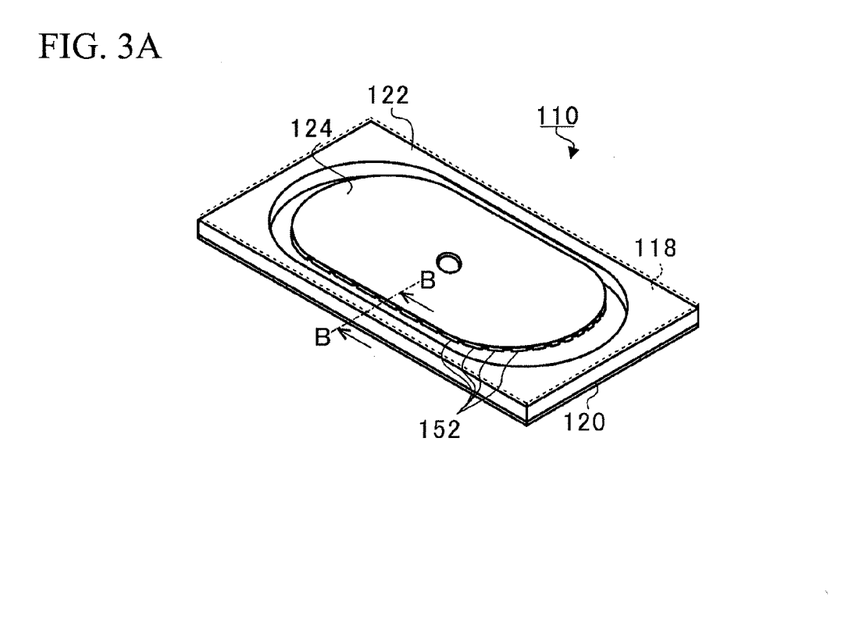
FIG. 3A is a perspective view to illustrate a plurality of projections.
Figure 3B:
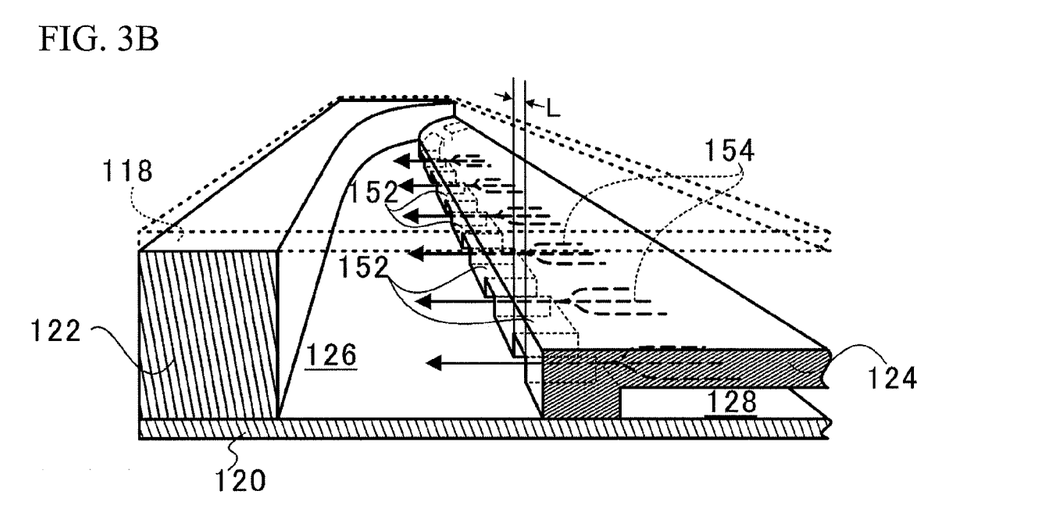
FIG. 3B is a perspective cross-sectional view along line B-B in FIG. 3A.

FIG. 3A is a perspective view to illustrate the plurality of projections 152. In addition, FIG. 3A is a transparent view of the combustion heater 110. FIG. 3B is a perspective cross-sectional view in which a cross-section along line B-B in FIG. 3A is viewed in the direction of arrows. In FIG. 3B, for easily understanding the structure of the projections 152, parts of the projections 152 hidden under the partition plate 124 are shown by broken lines. In addition, arrows 154 represent the flow direction of fuel gas. The flow path cross-section of the inflow path 128 is narrowed by the plurality of projections 152 provided on the partition plate 124. As shown in FIGS. 2B and 3B, fuel gas flows into the combustion chamber 126 through spaces between the projections 152 adjacent to each other in the inflow path 128. At this time, the interval L between the projections 152 becomes the characteristic dimension of the flow path cross-sectional shape. That is, without strictly setting the distance between the arrangement plate 120 and the partition plate 124, the characteristic dimension of the flow path cross-sectional shape can be set by the interval L.

The flame-quenching distance d of fuel gas is represented by the size of the diameter of a pipe wall model, and is calculated using the equation (1).

Equation (1):

$$d = 2\lambda \times Nu^{1/2} / Cp \times \rho u \times Su \qquad (1)$$

In the equation (1), $\lambda$ represents the heat conductivity, Nu represents the Nusselt number, Cp represents the specific heat at constant pressure, $\rho u$ represents the density of fuel gas, and Su represents the combustion rate.

Since the combustion heater 110 in this embodiment is designed so that the above characteristic dimension (interval L between the projections 152) is set less than or equal to the flame-quenching distance d, the stable combustion can be performed in the combustion chamber 126. In addition, the present invention is not limited to the structure of providing the plurality of projections 152, and one annular projection may be provided on the lower surface of the partition plate 124 in the vicinity of the combustion chamber 126. In this case, the distance between this projection and the arrangement plate 120 becomes the characteristic dimension. By using the simpler structure like this, the characteristic dimension of the inflow path 128 can be set less than or equal to the flame-quenching distance d.

As described above, in one combustion heater 110, since heat is transferred from the outflow path 130 to the inflow path 128, the thermal efficiency can become very high. In addition, since exhaust gas is gathered through the second pipe 134, damage to the surrounding environment can be prevented.

Next, the combustion-heating system 100 is described below, which is configured so as to connect the plurality of combustion heaters 110 like this to each other of the number based on the required performance in the amount of heat or the area of heating surface.

(Combustion-Heating System 100)

Figure 4:
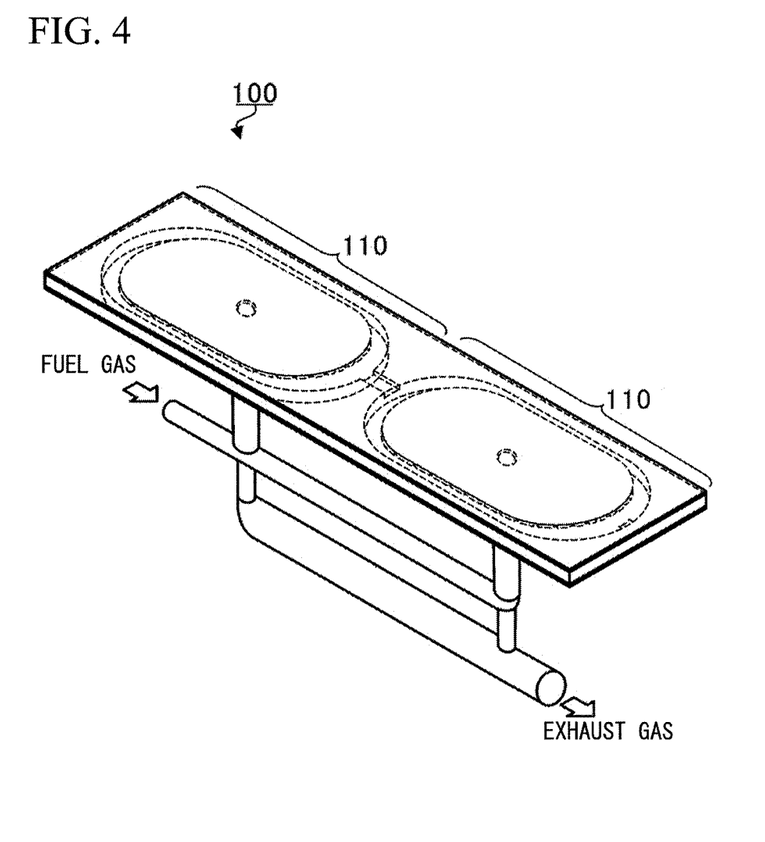
FIG. 4 is a perspective view showing an appearance example of a combustion-heating system.
Figure 5A:
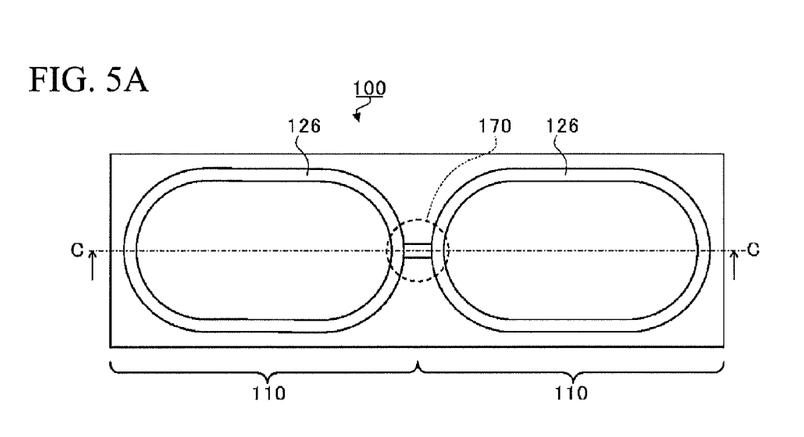
FIG. 5A is a plan view to illustrate the structure of the combustion-heating system.
Figure 5B:
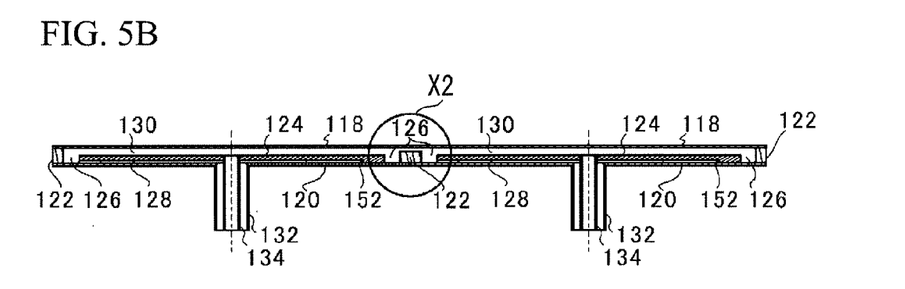
FIG. 5B is a cross-sectional view along line C-C in FIG. 5A.
Figure 5C:
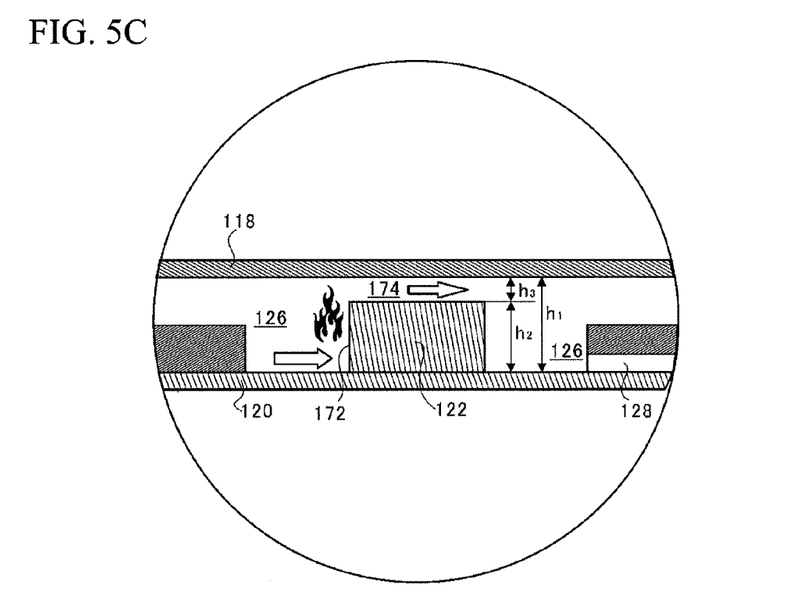
FIG. 5C is an expanded view of area X2 in FIG. 5B.
Figure 6:
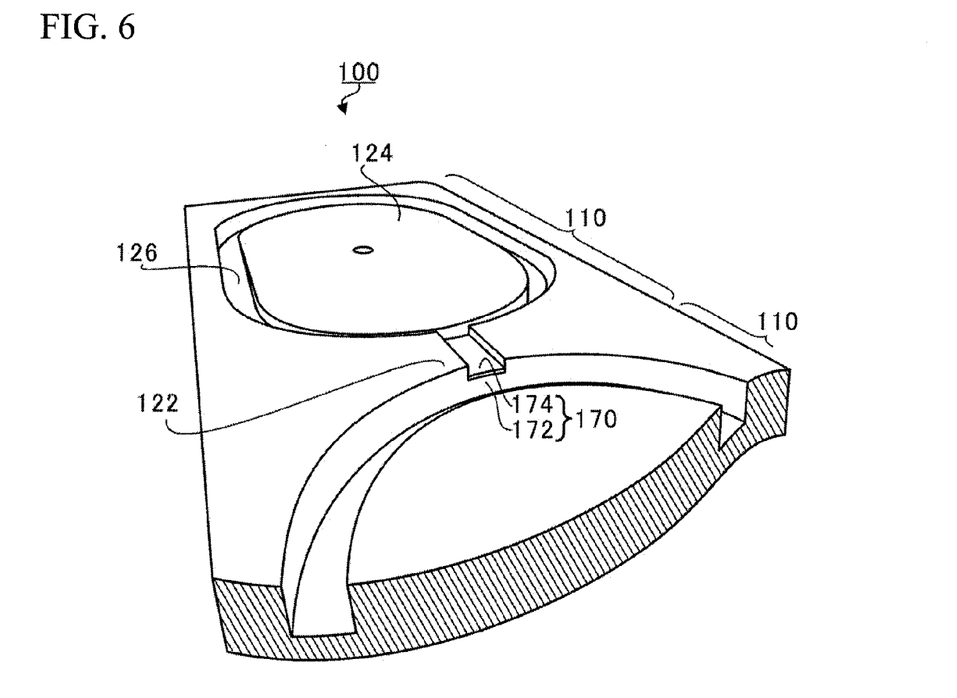
FIG. 6 is a perspective view to illustrate a flame-transferring part.

FIG. 4 is a perspective view showing an appearance example of the combustion-heating system 100. FIG. 5A is a plan view to illustrate the structure of the combustion-heating system 100. FIG. 5B is a cross-sectional view along line C-C in FIG. 5A. FIG. 5C is an expanded view of area X2 in FIG. 5B. FIG. 6 is a perspective view to illustrate a flame-transferring part 170. In addition, in FIG. 6, for convenience of description, part of the combustion-heating system 100 extended in the front side of this view is omitted, and a detailed representation about the cross-section of the omitted part is also omitted.

As shown in FIG. 4, the combustion-heating system 100 includes a structure in which the plurality of combustion heaters 110 are connected to each other, heats each combustion heater 110 by combusting the supplied fuel gas, and gathers the exhaust gas thereof.

In this embodiment, in order to obtain great performance in the amount of heat or the area of heating surface, the plurality of combustion heaters 110 which have relatively small performance in the amount of heat or the area of heating surface are connected to each other. Since the combustion heaters 110 having a relatively small size can be used, compared with a case of designing one combustion heater 110 so as to be large, each heat deformation thereof at the time of combustion can be reduced. In addition, even when other combustion heaters 110 are further connected thereto in accordance with the request to increase the amount of heat or the area of heating surface, each combustion performance thereof is not affected by the increase of the connected number of the combustion heaters 110. Therefore, the stability or durability thereof can be retained.

In this embodiment, for convenience of description, a case where two combustion heaters 110 are connected to each other is shown. However, one combustion heater 110 can be connected to another combustion heater 110 optionally in the longitudinal direction or the traverse direction, and the combustion-heating system 100 can be configured so as to have various length and width ratios.

As shown in FIGS. 5A and 6, a flame-transferring part 170 is formed at the connection part between the combustion heaters 110 in the combustion-heating system 100. The flame-transferring part 170 connects the enclosed spaces (combustion chambers 126, inflow paths 128, outflow paths 130) inside the connected combustion heaters 110, with each other. In addition, in a case where the combustion-heating system 100 is used in gas, the enclosed spaces do not have to be sealed completely. On the other hand, when the space between the heating plate 118, the arrangement plate 120, and the outer peripheral wall 122 is sealed completely, the combustion heater 110 can be used in liquid.

In the combustion-heating system 100 in which the combustion heaters 110 are connected to each other, for example, a function of igniting all the connected combustion heaters 110 by one ignition using an ignition device such as an igniter is required. The flame-transferring part 170 has to be formed while maintaining the sealing function of the combustion heaters 110. In addition, since the outer peripheral wall 122 in the combustion heater 110 has a flame-holding function, if part of the outer peripheral wall 122 is thoughtlessly removed in order to form the flame-transferring part 170, a stagnation point (place in which the flow of gas stagnates) may not be formed at the outer peripheral wall 122. Thereby, in accordance with the deterioration of the flame-holding performance, the CO emission concentration may be increased, and the proper thermal efficiency may not be obtained.

The flame-transferring part 170 in this embodiment includes a flame-holding part 172 constituting part of the outer peripheral wall 122, and a communication path 174 connecting the combustion chambers 126 with each other, in the connected combustion heaters 110. The flame-holding part 172 and the communication path 174 are disposed in series in the direction perpendicular to the heating plate 118 (the direction in which the heating plate 118 and the arrangement plate 120 face each other, that is, the height direction of the outer peripheral wall 122). The flame-holding part 172 is provided in the side of the arrangement plate 120, and the communication path 174 is provided in the side of the heating plate 118.

(Flame-Holding Part 172)

In this embodiment, as shown in FIG. 6, the communication path 174 is not formed in the entire range in the height direction of the outer peripheral wall 122. In addition, as the flame-holding part 172 which has the height required to hold flames, part of the outer peripheral wall 122 is left. Therefore, as shown in FIG. 5C in which the area X2 of FIG. 5B is expanded, the fuel gas which has flowed through the inflow path 128 collides with the flame-holding part 172 and combusts in the combustion chamber 126. Since the flame-holding part 172 has the height sufficient to secure the flame-holding performance in the combustion chamber 126, the same combustion as that in a combustion chamber 126 without forming the communication path 174 can be performed, and the thermal efficiency can be retained without discharging CO. In addition, in the combustion chamber 126, fuel gas collides with an inner circumferential surface of the outer peripheral wall 122 in the side of the arrangement plate 120, and the flow of the fuel gas is stagnated, thereby holding flames. That is, the combustion chamber 126 causes fuel gas to collide with the flame-holding part 172 constituting part of the outer peripheral wall 122 and thereby holds flames.

(Communication Path 174)

As shown in FIG. 5C, the communication path 174 is formed as a through-hole connecting the combustion chambers 126 with each other in the connected combustion heaters 110, above the flame-holding part 172. By this structure, the flames generated in one combustion heater 110 by ignition can be transferred to another through the communication path 174, and all the connected combustion heaters 110 can be ignited in a short amount of time. In this embodiment, an example in which the communication path 174 is formed above the flame-holding part 172 is shown, but when securing the flame-holding performance by the flame-holding part 172, the communication path 174 can be formed below the flame-holding part 172. In addition, in this embodiment, an example in which the cross-sectional shape of the communication path 174 is formed in a rectangular shape is shown, but the cross-sectional shape is not limited to this case, various shapes such as a circular shape or a polygonal shape can be used.

Unlike the characteristic dimension of the inflow path 128, the cross-sectional shape of the communication path 174 has to be designed so that flames pass through the communication path 174 (so that combustion reaction is transferred between the connected combustion heaters 110). Therefore, the characteristic dimension of the communication path 174 is set longer than the flame-quenching distance d of the above equation (1). For example, in a case where the flame-quenching distance d is 3 mm, when the cross-sectional shape of the communication path 174 is set in the rectangular shape of height: 3 mm×width: 10 mm, the characteristic dimension thereof becomes 4.6 mm, and thereby flame can be transferred sufficiently. Thus, as shown in FIG. 5C, the height $h_1$ of the outer peripheral wall 122 in the combustion heater 110 composing the combustion-heating system 100 is the sum of the height $h_2$ of the flame-holding part 172 required to hold flames and the height $h_3$ of the communication path 174 determined based on the flame-quenching distance d of the communication path 174.

The communication path 174 is formed at a position at which the distance between the combustion chambers 126 in the connected combustion heaters 110 is the shortest. For example, in FIG. 5A, the communication path 174 is formed at the connection part between the connected combustion heaters 110 and is formed at the approximate middle in the traverse direction of the combustion-heating system 100. In this embodiment, since the inner circumference of the outer peripheral wall 122 in the combustion heater 110 is formed in a flat oval shape, by disposing the communication path 174 in a straight line which connects the centers to each other of the arcs of the flat oval shape, the distance between the combustion chambers 126 becomes the shortest. By shortening the distance between the combustion chambers 126 like this, the flame-quenching distance d of the communication path 174 can become short. Thus, even in a case where the characteristic dimension of the communication path 174 is set short, flames can be transferred reliably, and the reliability of ignition can be improved. In addition, the position of the communication path 174 is not limited to the position at which the distance between the combustion chambers 126 becomes the shortest, and can be set optionally in the range able to transfer flames. By providing the communication path 174, the stable flame-transferring was confirmed under the operational conditions of the combustion-heating system 100.

In addition, not only flame-transferring is performed based on the combustion in the combustion chamber 126 in the vicinity of the communication path 174, but also flame-transferring is assisted by pressure waves to be generated inside the combustion heater 110.

Figure 7:
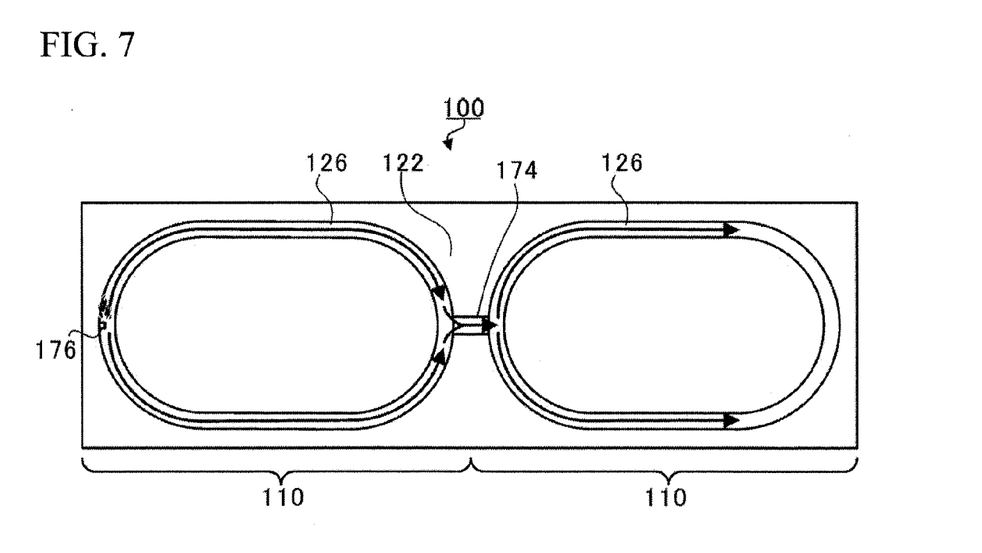
FIG. 7 is a plan view to illustrate transfer of flames.

FIG. 7 is a plan view to illustrate transfer of flames. For example, when an ignition device 176 ignites the combustion chamber 126 near thereto, as shown by arrows in FIG. 7, flames are sequentially transferred along the inner circumferential surface of the outer peripheral wall 122, inside the combustion chamber 126. By the pressure generated inside the combustion chamber 126 when igniting fuel gas, pressure waves in a direction (right direction in FIG. 7) closer to another connected combustion heater 110 are caused, and the transfer velocity of flames becomes high by the pressure waves. In addition, the pressure waves like this are gathered by an inner circumferential surface of the outer peripheral wall 122 formed in a semicircular shape in plan view, and flow into the communication path 174 as being accelerated. Thereby, flames are easily transferred to another connected combustion heater 110.

In this way, by the structure in which the flame-holding part 172 and the communication path 174 are provided in series in the up and down direction, both of the flame-transferring performance and the flame-holding performance can be satisfied at the time of ignition. In addition, all the combustion heaters 110 can be ignited by only one ignition without reference to the number of the connected combustion heaters 110, and cost reduction and improved workability can be achieved. Furthermore, at the time of usual combustion, in each combustion heater 110 composing the combustion-heating system 100, it is possible to maintain high thermal efficiency and to improve the surrounding environment, as described above.

Figure 8A:
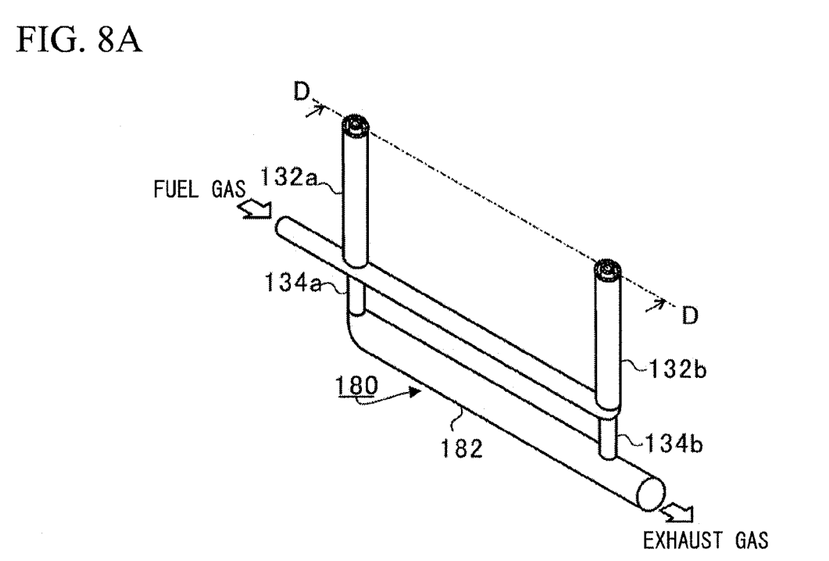
FIG. 8A is a perspective view to illustrate a communication pipe.
Figure 8B:
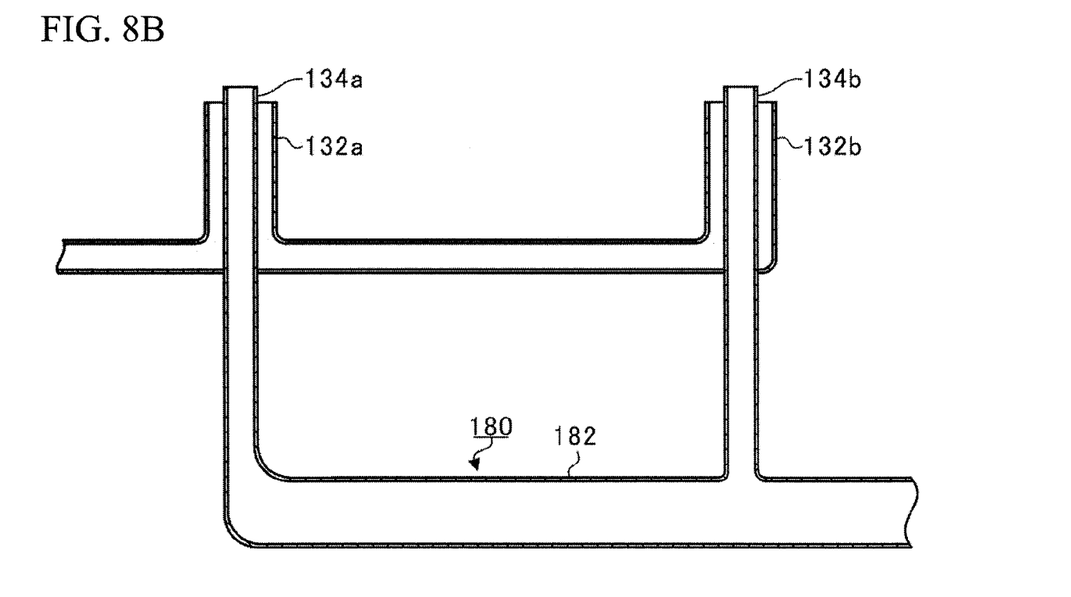
FIG. 8B is a cross-sectional view along line D-D in FIG. 8A.

FIG. 8A is a perspective view to illustrate a communication pipe 180. In addition, FIG. 8A is a perspective view of piping in the combustion-heating system 100. FIG. 8B is a cross-sectional view along line D-D in FIG. 8A. In FIGS. 8A, 8B and FIGS. 9A, 9B described below, only piping is shown for easy understanding, but the piping is connected to the main containers of the combustion heaters 110.

Hereinafter, in the first pipe 132 and the second pipe 134, pipes connected to the main container of the combustion heater 110 including the ignition device 176 are regarded as a first pipe 132a and a second pipe 134a respectively. In addition, pipes connected to the main container of the combustion heater 110 in the side in which flames are transferred through the communication path 174 are regarded as a first pipe 132b and a second pipe 134b respectively.

As shown in FIG. 8B, the combustion-heating system 100 includes a communication pipe 180 connecting the second pipes 134a, 134b of the combustion heaters 110 with each other. The communication pipe 180 includes an expanded part 182 in which the flow path area thereof is greater than that of the second pipe 134a or 134b. The flow path area is the cross-sectional area of flow path in a direction orthogonal to the flow direction of exhaust gas. In this embodiment, as shown in FIGS. 8A, 8B, the entire flow path of the communication pipe 180 is formed wider than the flow path of the second pipe 134a or 134b. That is, the expanded part 182 is formed over the whole of the communication pipe 180. In addition, the flow path area of part of the communication pipe 180 may be set greater than that of the second pipe 134a or 134b, and an expanded part 182 may be provided only in the part of the communication pipe 180.

In the combustion-heating system 100, when one combustion heater 110 is ignited by the ignition device 176, as described above, flames are sequentially transferred along the inner circumferential surface of the outer peripheral wall 122 inside the combustion chamber 126, the pressure waves generated when igniting fuel gas go into the communication path 174, and the flames are transferred into another connected combustion heater 110. At this time, there is a case in which pressure waves are sequentially transferred from the ignited combustion heater 110 to the second pipe 134a, the communication pipe 180, the second pipe 134b, and the combustion heater 110 into which flames are transferred. The transfer of the pressure waves is described below in detail with reference to FIGS. 9A, 9B.

Figure 9A:
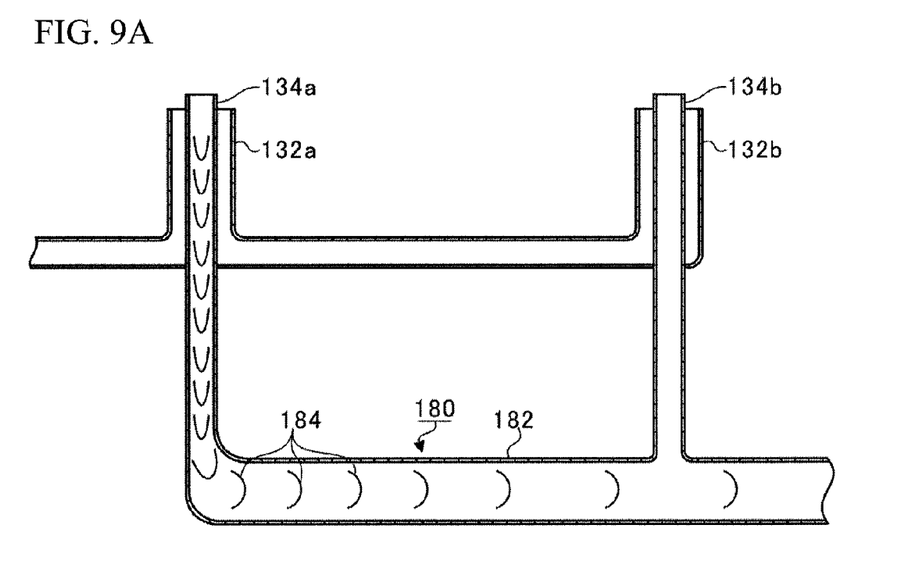
FIG. 9A is a vertical cross-sectional view to illustrate transfer of pressure waves.
Figure 9B:
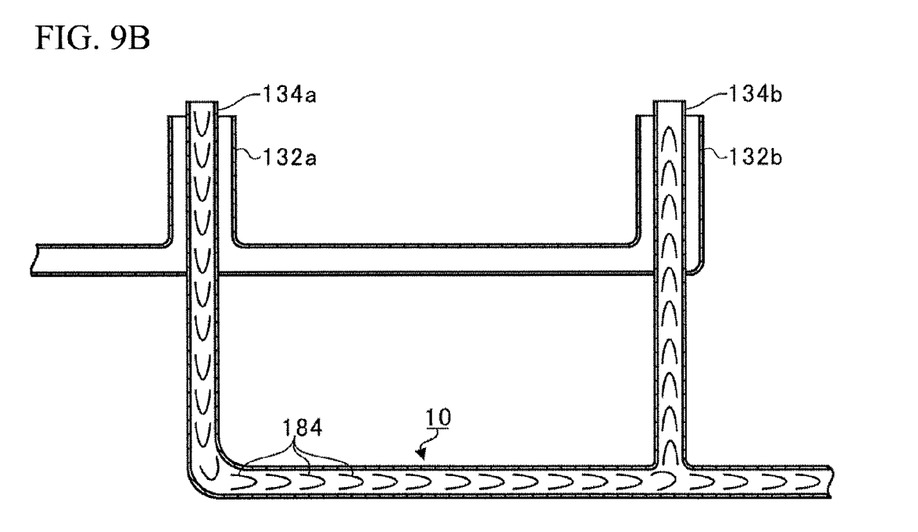
FIG. 9B is a vertical cross-sectional view to illustrate transfer of pressure waves.

FIGS. 9A, 9B are vertical cross-sectional views to illustrate transfer of pressure waves. FIG. 9A shows the structure in this embodiment, and FIG. 9B shows the structure of a comparative example. In addition, for easy understanding, as pressure waves increase in strength, a plurality of oval arcs 184 are shown so as to be closer to each other. In the comparative example shown in FIG. 9B, the flow path area of a communication pipe 10 is equal to the flow path area of the second pipe 134a or 134b. In this case, the generated pressure waves are transferred through the second pipe 134b of the combustion heater 110 to which flames are transferred, in a reverse flow direction (direction reverse to the flow direction of exhaust gas), almost without being weakened inside the communication pipe 10.

In this way, when the pressure waves are transferred into the combustion heater 110 into which flames are transferred, since the flow of exhaust gas is disturbed in the combustion heater 110 into which flames are transferred, the transfer of flames through the communication path 174 is inhibited, and the flame-transferring performance is degraded. That is, there is a possibility that the range of conditions for which the transfer of flames can occur is narrowed, thereby not transferring flames for some conditions.

In the combustion-heating system 100 in this embodiment, as shown in FIG. 9A, the communication pipe 180 includes the expanded part 182. The pressure waves, which transfer through the second pipes 134a, 134b into the combustion heater 100 into which flames are transferred, are weakened by the expansion of flow path, when transferring from the second pipe 134a into the communication pipe 180.

In addition, since the cross-sectional area of flow path of the expanded part 182 is large, the volume of medium (gas such as exhaust gas or air inside the communication pipe 180) through which pressure waves are transferred is large. Accordingly, by transferring inside the communication pipe 180, the energy of pressure waves is further weakened relative to the comparative example of FIG. 9B.

Furthermore, since pressure waves are transferred from the pipe having a large flow path area into the pipe having a small flow path area at the connection part between the communication pipe 180 and the second pipe 134b, it becomes further difficult that the pressure waves transfer.

In this way, the combustion-heating system 100 can reduce the influence of transfer of pressure waves through the second pipes 134a, 134b, and can further improve the flame-transferring performance of flames transferring through the communication path 174 into another connected combustion heater 110.

Though the preferable embodiment of the present invention has been described with reference to the drawings, the present invention is not limited to this embodiment. One of ordinary skill in the art can adopt various modifications within the scope described in claims of the present application, and the modifications are also included in the present invention.

For example, in the above embodiment, the inner circumferential surface of the outer peripheral wall 122 is formed in a flat oval shape in plan view, but may be formed in any shape as far as in an annular shape. The inner circumferential surface of the outer peripheral wall 122 may be formed in a circular annular shape or a rectangular annular shape in plan view.

INDUSTRIAL APPLICABILITY

The present invention can be applied to a combustion-heating system in which a plurality of combustion heaters to heat an object to be heated by combusting fuel are connected to each other.

DESCRIPTION OF REFERENCE SIGNS

100 Combustion-heating system
110 Combustion heater
118 Heating plate
120 Arrangement plate
122 Outer peripheral wall
124 Partition plate
126 Combustion chamber
128 Inflow path
130 Outflow path
132, 132a, 132b First pipe
134, 134a, 134b Second pipe
170 Flame-transferring part
172 Flame-holding part
174 Communication path
176 Ignition device
180 Communication pipe
182 Expanded part

The invention claimed is:
1. A combustion-heating system comprising:
a plurality of combustion heaters connected to each other,
a combustion heater including:
a heating plate;
an arrangement plate disposed facing the heating plate;
an annular outer peripheral wall disposed between the heating plate and the arrangement plate;

a partition plate disposed between the heating plate and the arrangement plate;

a combustion chamber positioned along the outer peripheral wall, the combustion chamber being configured so that fuel gas collides with a flame-holding part, the flame-holding part constituting part of the outer peripheral wall, thereby holding flames;

an inflow path in which sidewalls thereof are constituted by the arrangement plate and the partition plate, the fuel gas flowing through the inflow path into the combustion chamber; and an outflow path in which sidewalls thereof are constituted by the heating plate and the partition plate, exhaust gas flowing through the outflow path from the combustion chamber toward the outside thereof, the outflow path being configured to preheat the fuel gas by heat of the exhaust gas through the partition plate; and a communication path disposed at a connection part between each pair of the plurality of combustion heaters that are connected to each other by the connection part, the communication path connecting combustion chambers thereof with each other, the communication path being formed between the heating plate and the annular outer peripheral wall, the communication path being configured so that flames generated in one of the combustion heaters by ignition are transferred to another one of the combustion heaters, which is connected to the one of the combustion heaters by the connection part, through the communication path, wherein the flame-holding part, with which the fuel gas collides thereby holding flames, and the communication path are provided in series in a direction in which the heating plate and the arrangement plate face each other.

2. The combustion-heating system according to claim 1, wherein a height of the outer peripheral wall is the sum of a height of the flame-holding part required to hold flames and a height of the communication path determined based on a flame-quenching distance of the communication path.

3. The combustion-heating system according to claim 1, wherein the communication path is disposed at a position at which a distance between the combustion chambers in the pair of the plurality of combustion heaters which are connected to each other is the shortest.

4. The combustion-heating system according to claim 1, further comprising:

a first pipe connected to the inflow path, the fuel gas flowing through the first pipe into the combustion heater;

a second pipe connected to the outflow path, the exhaust gas flowing through the second pipe toward the outside of the combustion heater; and a communication pipe connecting second pipes in the plurality of combustion heaters, with each other, wherein the communication pipe includes an enlarged part in which a flow path area thereof is greater than that of the second pipes.

5. The combustion-heating system according to claim 4, wherein one of the first pipe and the second pipe is disposed inside the other of the first pipe and the second pipe, and the first pipe and the second pipe constitute a duplex pipe.

6. The combustion-heating system according to claim 2, wherein the height of the communication path is set so that a characteristic dimension of the communication path is larger than the flame-quenching distance of the communication path.

7. The combustion-heating system according to claim 1, wherein an external surface of at least one of the heating plate and the arrangement plate constitutes a radiation surface which is heated by the combustion of the fuel gas and transfers radiation heat to an object to be heated.

* * * * *